(12) United States Patent
Byma et al.

(10) Patent No.: US 6,451,233 B1
(45) Date of Patent: Sep. 17, 2002

(54) METHOD OF MAKING A MULTIPLE FOAM INTERIOR TRIM SUBSTRATE

(75) Inventors: George B. Byma, Haar (DE); Brian A. Cristea, Royal Oak, MI (US); Richard Mühlbacher, Grassau (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/561,002

(22) Filed: Apr. 28, 2000

(51) Int. Cl.[7] .................. B29C 44/06; B29C 44/12
(52) U.S. Cl. ............... 264/46.4; 264/45.1; 264/46.7; 264/255; 264/271.1
(58) Field of Search ..................... 264/255, 271.1, 264/46.4, 45.1, 46.7

(56) References Cited

U.S. PATENT DOCUMENTS

| 3,534,129 A | * | 10/1970 | Bartel ..................... 264/46.4 |
| 4,246,213 A | | 1/1981 | Takamatsu et al. |
| 4,327,937 A | | 5/1982 | Scholz et al. |
| 4,714,575 A | * | 12/1987 | Preston .................... 264/46.4 |
| 4,893,833 A | | 1/1990 | DiSalvo et al. |
| 4,923,653 A | * | 5/1990 | Matsuura et al. .......... 264/46.4 |
| 4,975,229 A | * | 12/1990 | Kita et al. ................. 264/46.6 |
| 5,043,114 A | * | 8/1991 | Saito et al. ................. 264/255 |
| 5,072,967 A | * | 12/1991 | Batchelder et al. ......... 280/732 |
| 5,082,310 A | | 1/1992 | Bauer |
| 5,176,860 A | * | 1/1993 | Storch ..................... 264/46.7 |
| 5,224,732 A | | 7/1993 | Warner et al. |
| 5,273,309 A | | 12/1993 | Lau et al. |
| 5,308,112 A | | 5/1994 | Hill et al. |
| 5,382,051 A | | 1/1995 | Glance |
| 5,498,030 A | | 3/1996 | Hill et al. |
| 5,503,427 A | | 4/1996 | Ravenberg et al. |
| 5,547,214 A | | 8/1996 | Zimmerman, II et al. |
| 5,601,332 A | | 2/1997 | Schultz et al. |
| 5,803,490 A | | 9/1998 | Seventko et al. |
| 5,826,938 A | | 10/1998 | Yanase et al. |
| 5,829,778 A | | 11/1998 | Woolley et al. |
| 5,837,172 A | * | 11/1998 | Pritchard et al. ........... 264/255 |
| 5,839,752 A | | 11/1998 | Yamasaki et al. |
| 5,845,929 A | | 12/1998 | Schlett et al. |
| 5,860,673 A | | 1/1999 | Hasegawa et al. |
| 5,863,064 A | | 1/1999 | Rheinlander et al. |
| 5,865,461 A | | 2/1999 | Totani et al. |
| 5,871,229 A | | 2/1999 | Saito |
| 5,927,749 A | | 7/1999 | Homier et al. |
| 5,941,557 A | | 8/1999 | Mullins, Jr. et al. |
| 5,967,546 A | | 10/1999 | Homier et al. |
| 5,989,699 A | * | 11/1999 | Kuczynski et al. ......... 264/46.6 |
| 6,045,732 A | * | 4/2000 | Nakatsuji et al. ........... 264/255 |

* cited by examiner

*Primary Examiner*—Allan R. Kuhns
(74) *Attorney, Agent, or Firm*—Brooks & Kushman P.C.

(57) ABSTRACT

The present invention relates to a multiple foam substrate of predetermined shape and a method of manufacturing the substrate. The substrate is a multiple foam substrate which may be manufactured by the method with a mold having first and second mold cavities. The method includes injecting a first foam into the first mold cavity sufficiently to fill the first mold cavity and storing the first foam in the first mold cavity for a predetermined time sufficient to form a substantially non-mixing surface on the first foam. The method further includes injecting a second foam into the second mold cavity and onto the non-mixing surface on the first foam sufficiently to fill the second mold cavity. The method further includes storing the second foam in the second mold cavity for a predetermined time sufficient to bond the first foam to the second foam along the non-mixing surface.

26 Claims, 5 Drawing Sheets

METHOD OF MAKING A MULTIPLE FOAM INTERIOR TRIM SUBSTRATE

TECHNICAL FIELD

The present invention relates to a multiple foam substrate for impact energy absorption and airbag deployment, and a method of making the same in vehicles.

BACKGROUND ART

There is a growing need to improve the impact energy absorption properties of automotive interior trim substrates. Such sheet metal structures include pillars, side rails, and roof structures. However, the industry has been challenged in determining a cost effective way of manufacturing interior trim substrates and interior components in order to meet industry demands. For example, manufacturers continue to search for ways of improving the properties of substrates for absorbing energy in a cost saving manner while providing structural support.

One challenge that manufacturers are faced with is that impact energy absorption throughout the passenger compartment, such as on pillars, side rails, or the roof structure of a vehicle, requires different energy absorption material, including molded foam or beads. This is due to the vehicle structure design which typically includes a plurality of sheet metal pieces that form the passenger compartment of a vehicle. The thickness and geometric stiffness of the sheet metal typically determine the amount of energy absorption material required. That is, the thicker and/or stiffer the sheet metals is, the more absorption material is required to meet industry demands. Thus, different energy absorption materials would be useful to have in interior trim substrates.

There is also a growing need to improve airbag deployment properties of automotive interior trim substrates. Upon impact, airbags may be deployed from various locations within a vehicle compartment, such as pillars, side panels, roof structures, and front panels. However, the industry has also been challenged in determining a cost effective way of manufacturing interior trim substrates with airbags and interior components in order to meet industry demands. For example, manufacturers continue to search for ways of improving the properties of a substrate for accommodating an airbag disposed thereto to deploy from the substrate.

A deployable airbag is typically disposed between the metal sheet structure, such as a pillar, and the interior trim substrate. The airbag is typically fastened to an area of the sheet metal structure and adjacent the energy absorbing part which is covered by an interior substrate. This separate manufacturing and assembly process used in disposing the deployable airbag between the structure and the interior trim substrate results in further additional manufacturing time and costs.

Although current energy absorbing parts are adequate, improvements can be made thereupon. Currently, multi-component parts are manufactured for impact energy absorption and air bag deployment purposes. Some multi-components are separately manufactured and then combined to comprise a part which is fastened to an area of a vehicle compartment, such as a pillar. More particularly, a single foam is molded to form a shape of a vehicle component to which it may be attached. The molded foam is then adhered to a predetermined area on an interior trim material or a shell which then fastens onto the structure of a vehicle. The separate manufacturing processes used in forming the molded foam and the interior trim substrates result in additional manufacturing time and costs.

Thus, what is needed is an improved system and method of making an integrally formed substrate that more efficiently meets the industry demands for energy absorption on collision impacts.

What is also needed is an improved system and method of making a substrate that provides for a deployable airbag system for deployment therefrom.

DISCLOSURE OF INVENTION

An object of the present invention is to provide for a method of manufacturing a multiple foam substrate of a predetermined shape for selective impact energy absorption with a mold having first and second mold cavities. The method includes injecting a first foam into the first mold cavity sufficiently to fill the first mold cavity, and storing the first foam in the first mold cavity for a predetermined time sufficient to form a substantially non-mixing surface on the first foam. The method further includes injecting a second foam into the second mold cavity and onto the non-mixing surface on the first foam sufficiently to fill the second mold cavity, and storing the second foam in the second mold cavity for a predetermined time sufficient to bond the first foam to the second foam along the non-mixing surface, whereby to define the multiple foam substrate having the predetermined shape.

Another object of the present invention is to provide for a method of manufacturing a multiple foam substrate of a predetermined shape for selective impact energy absorption and airbag deployment with a mold having first and second cavities. The method includes injecting a first foam into the first mold cavity sufficiently to fill the first mold cavity, and storing the first foam in the first mold cavity for a predetermined time sufficient to form a substantially non-mixing surface on the first foam. The method further includes loading a deployable airbag onto the non-mixing surface. The method further includes injecting a second foam into the second mold cavity and onto the non-mixing surface adjacent the deployable airbag sufficiently to fill the second mold cavity, and storing the second foam in the second mold cavity for a predetermined time sufficient to bond the first foam to the second foam along the non-mixing surface, whereby to define the multiple foam substrate having the predetermined shape.

Yet another object of the present invention provides for a multiple foam substrate of a predetermined shape for impact energy absorption manufactured by the process of injecting a first foam into a first mold cavity of a mold sufficiently to fill the first mold cavity, storing the first foam in the first mold cavity for a predetermined time sufficient to form a substantially non-mixing surface on the first foam, injecting a second foam into a second mold cavity of the mold and onto the non-mixing surface on the first foam sufficiently to fill the second mold cavity, and storing the second foam in the second mold cavity for a predetermined time sufficient to bond the first foam to the second foam along the non-mixing surface.

Yet another object of the present invention is to provide for a mold for manufacturing a multiple foam substrate of predetermined shape. The mold comprises an upper portion and a lower portion. The upper portion has a first surface from which a first section extends and a second surface from which a second section extends. The second surface is adjacent the first surface. The lower portion has a lower surface from which a lower section extends. The first section is configured to engage with the lower section to define a first mold cavity at a first closed position. The second section is configured to engage with the lower section to define a second mold cavity at a second position.

BEST MODE FOR CARRYING OUT THE INVENTION

Figure 1:
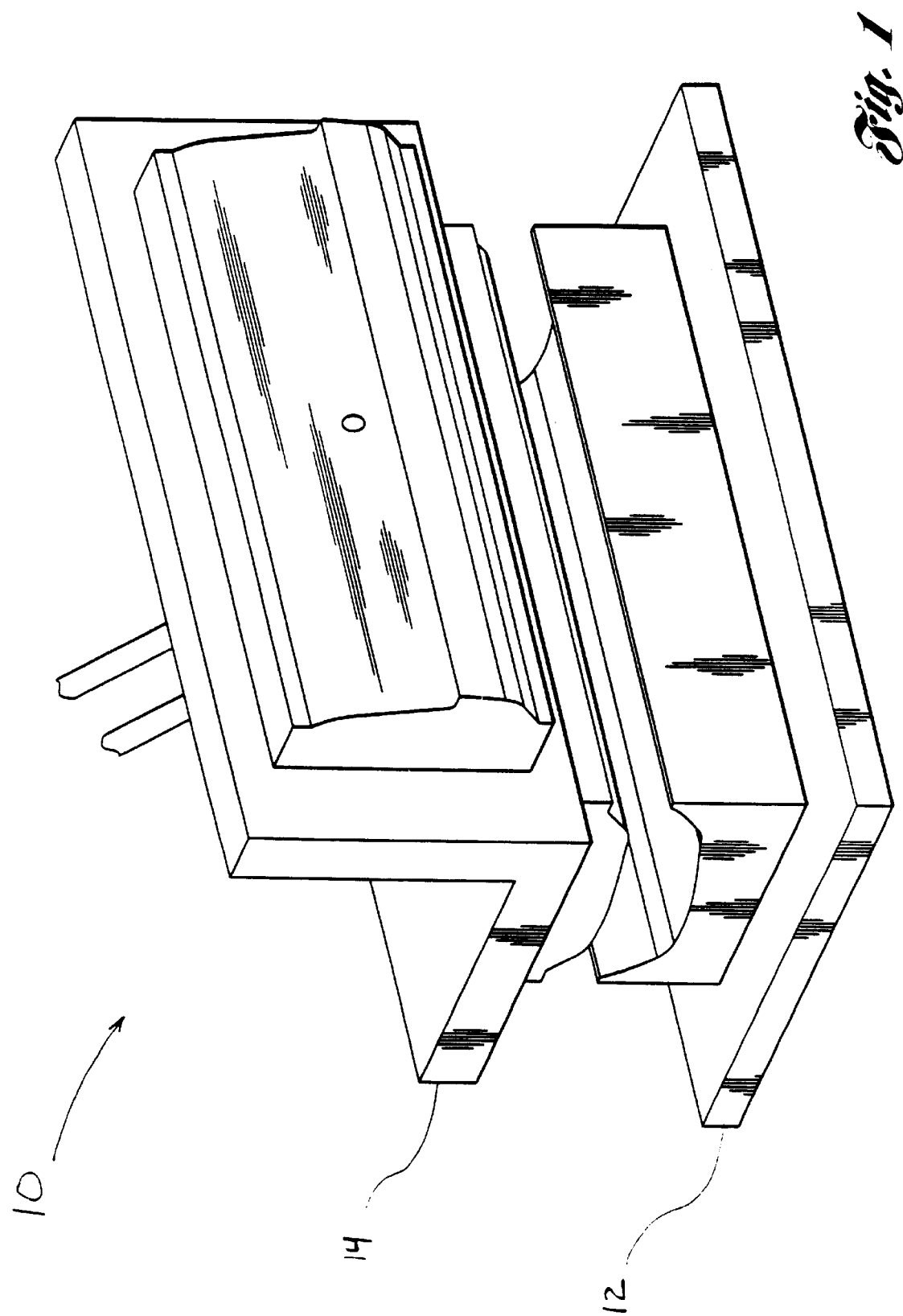
FIG. 1 is a perspective view of a mold drawn partially in phantom which may be used in carrying out the present invention.

FIG. 1 illustrates a mold 10 drawn partially in phantom. Mold 10 may be used for manufacturing a multiple foam interior trim substrate in accordance with one embodiment of the present invention. As shown, mold 10 includes lower portion 12 and upper portion 14 (drawn in phantom).

Figure 2:
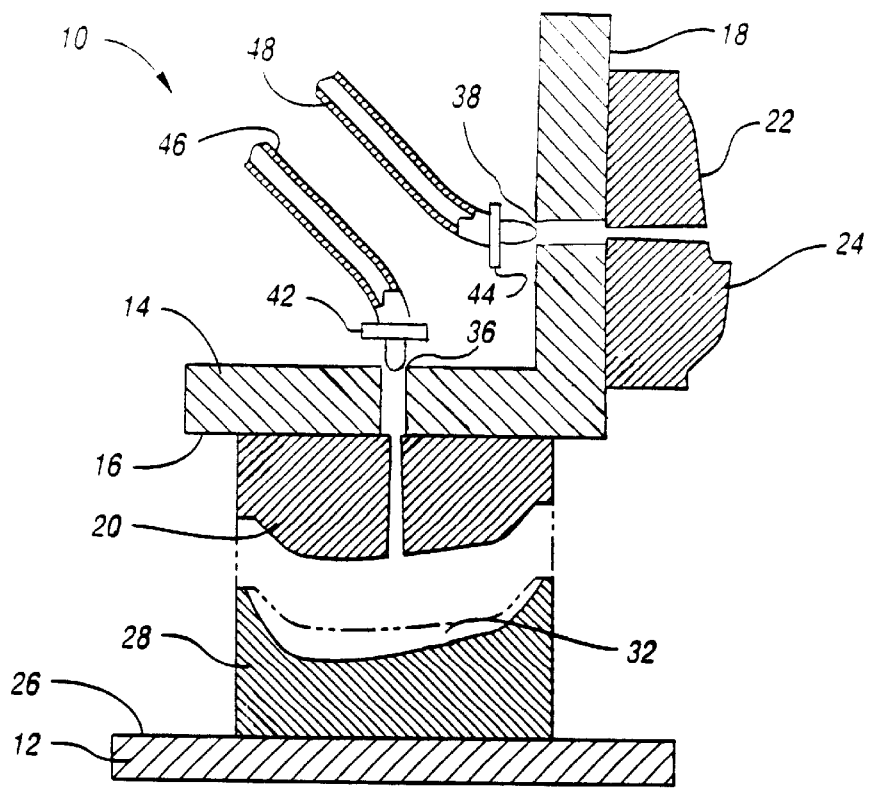
FIG. 2 is a cross-sectional view of the mold of FIG. 1 to depict a first foam injected in a first mold cavity of the mold.

FIG. 2 illustrates a cross-sectional side view of mold 10 in a first open position. As shown, upper portion 14 includes first surface 16 from which first section 20 extends downwardly toward lower portion 12. Upper portion 14 further includes second surface 18 from which second section 22 extends. Second section 22 includes extension 24 integrally extending from second section 22. Lower portion 12 includes lower surface 26 from which lower section 28 extends upwardly. From the open position, first section 20 is lowered to a first closed position and engages lower section 28 to define first mold cavity 32. Moreover, upper portion 14 includes first injection hole 36 formed thereon through first surface 16 and first section 20. Hole 36 is in fluid communication with first mold cavity at the first closed position. First injection hole 36 is formed to receive first nozzle 42 through which first foam 43 is injected into first mold cavity 32.

Figure 3:
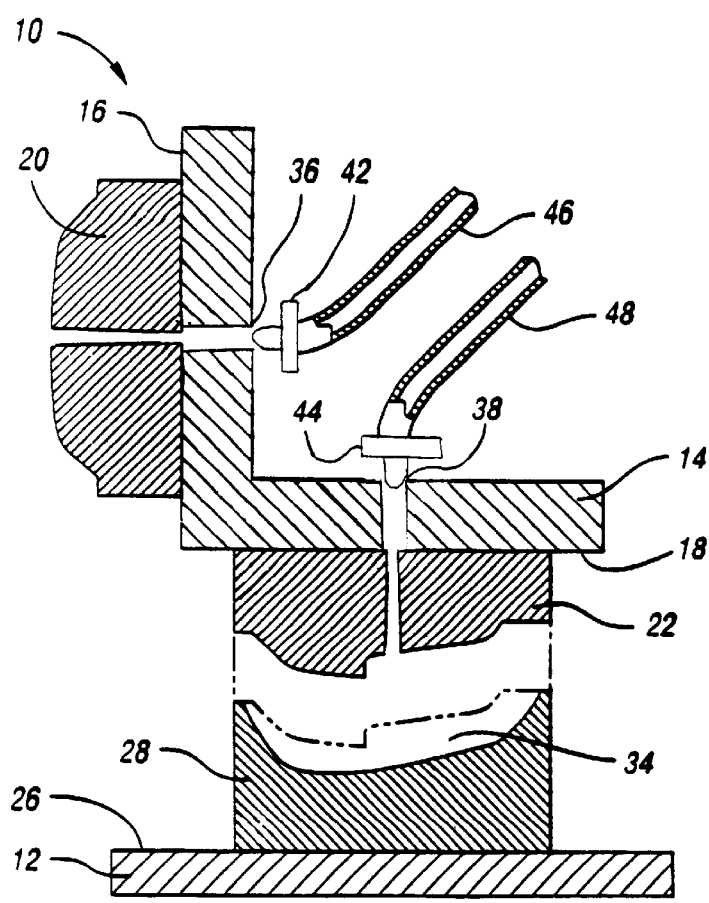
FIG. 3 is a cross-sectional view of the mold to depict a second foam injected into a second mold cavity of the mold.

FIG. 3 illustrates a cross-sectional side view of mold 10 in a second open position. From the second open position, second section 22 is lowered to a second closed position and engages lower section 28 to define second mold cavity 34. Upper portion 14 further includes second injection hole 38 formed thereon through second surface 18 and second section 22. Hole 38 is in fluid communication with second mold cavity 34 in the second closed position, as shown in FIG. 3. Second injection hole 38 is formed to receive second nozzle 44 through which second foam 45 is injected into second mold cavity 34, as shown in FIG. 3. As shown, upper portion 14 rotates approximately 90° such that second surface 18 faces downwardly toward lower surface 26 in order for second section 22 to engage with lower section 28.

Mold 10 may include conventional controls, plumbing, and mold-actuating mechanisms to allow proper operation of lower portion 12 and upper portion 14. For example, portions 12, 14 of mold 10 may be mounted on tie-rods. In this embodiment lower portion 12 is stationary, while upper portion 14 is movable to permit opening and closing of portions 12 and 14. Moreover, upper portion 14 is configured to rotate providing pivotal movement such that second section 22 faces downwardly and may engage with lower section 28. Actuations of portions 12,14 may be by hydraulic, air cylinder, or manual.

Preferably, first and second foams 43,45 are polyurethane foams having different properties. For example, first foam 43 is preferably a high density flexible urethane foam and second foam 45 is preferably a rigid structural foam. High density urethane foam is defined as foam having a density of a range between 80–125 kg/m$^3$. Structural foam is defined as urethane foam having a density of a range between 40–150 kg/m$^3$. The foams may respectively be supplied through their respective nozzles from separate conventional mixheads (not shown) which dispense a mixture of preferably isocyanate and polyol systems into the mold in the closed positions. Moreover, the isocyanate and polyol systems may be stored in separate tanks, and metered to the respective mixhead. It is to be noted that other foams may be used which would not fall beyond the scope or spirit of the present invention. It is to be noted that the material comprising the foam, e.g., polyurethane, may be recycled material or virgin (non-recycled) material.

Figure 4:
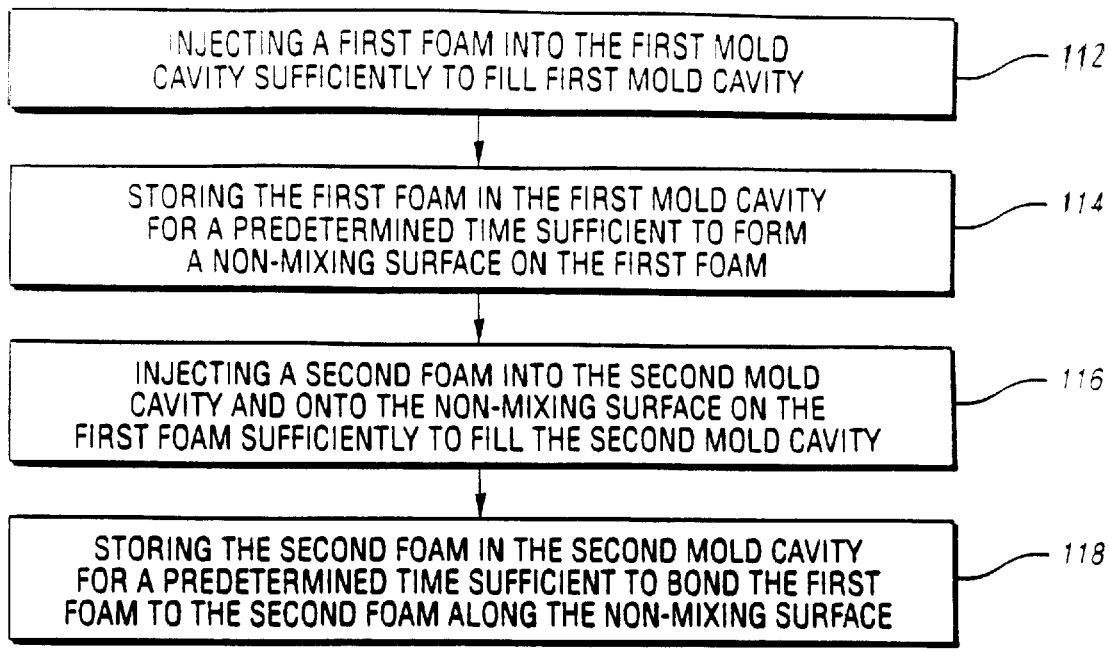
FIG. 4 is a flow chart of one method implemented in making a multiple foam substrate with the mold of FIG. 1 in accordance with the present invention.

FIG. 4 illustrates one method 110 implemented to manufacture a multiple foam interior trim substrate with mold 10 of FIGS. 1–3. As shown in box 112, the method includes providing first foam 43 and second foam 45 of differing physical properties. In this embodiment, first foam 43 is a flexible polyurethane foam and second foam 45 is a rigid polyurethane foam. A difference in the densities between foams 43, 45 provides a difference in physical properties of the two foams. In this embodiment, first foam 43 has a density less than the density of second foam 45. However, first foam 43 may have a greater density than second foam 45. In such embodiment, mold 10 of FIGS. 1–3 will have sections configured to form interior trim substrate 210.

In this embodiment, first foam 43 is injected into first mold cavity 32, as shown in box 114 of FIG. 4. First foam 43 is injected into first mold cavity 32 through hole 36 by first nozzle 42 at a temperature between about 70° and 90° F. and at a high pressure of up to 3000 pounds per square inch gauge (psig). Within about 1–15 seconds, first mold cavity 32 is filled with first foam 43, and nozzle 42 is closed. First foam 43 in first mold cavity 32 is stored for 2–3 minutes in order to cure to form a substantially non-mixing surface of a resulting part as shown in box 116. During the curing duration, the resulting part increases in strength and stiffness enough to substantially prevent mixing of fist and second foams 43, 45 when second foam 45 is injected thereon, as described below.

After storing first foam 43 in first mold cavity 32, upper portion 14 of mold 10 disengages from stationary lower portion 12 by moving upwardly. Upper portion 14 then rotates about 90° in order for second surface 18 to face downwardly toward lower section 28 of lower surface 26. Upper portion 14 then moves downwardly to engage second section 22 with lower section 28. Through hole 38, second nozzle 44 injects second foam 45 into second mold cavity 34 onto the non-mixing surface of first foam 43, as shown in box 118. When second mold cavity is filled, within about 1–15 seconds, nozzle 44 closes at a temperature between about 70° and 90° F. and at a high pressure of up to 3000 pounds per square inch gauge (psig). As shown in box 120, second foam 45 is stored in second mold cavity 34 for 2–3 minutes in order to cure and bond with the non-mixing surface of first foam 43 to define the multiple foam substrate having the predetermined shape. The curing duration allows the substrate to build up enough strength and stiffness to be bonded with the non-mixing surface of the resulting part and to be removed from the mold when sufficient curing is complete. After removal of the substrate, the substrate is post-cured for 1–2 days at approximately 70° F. to enhance physical properties and part stability.

Figure 5:
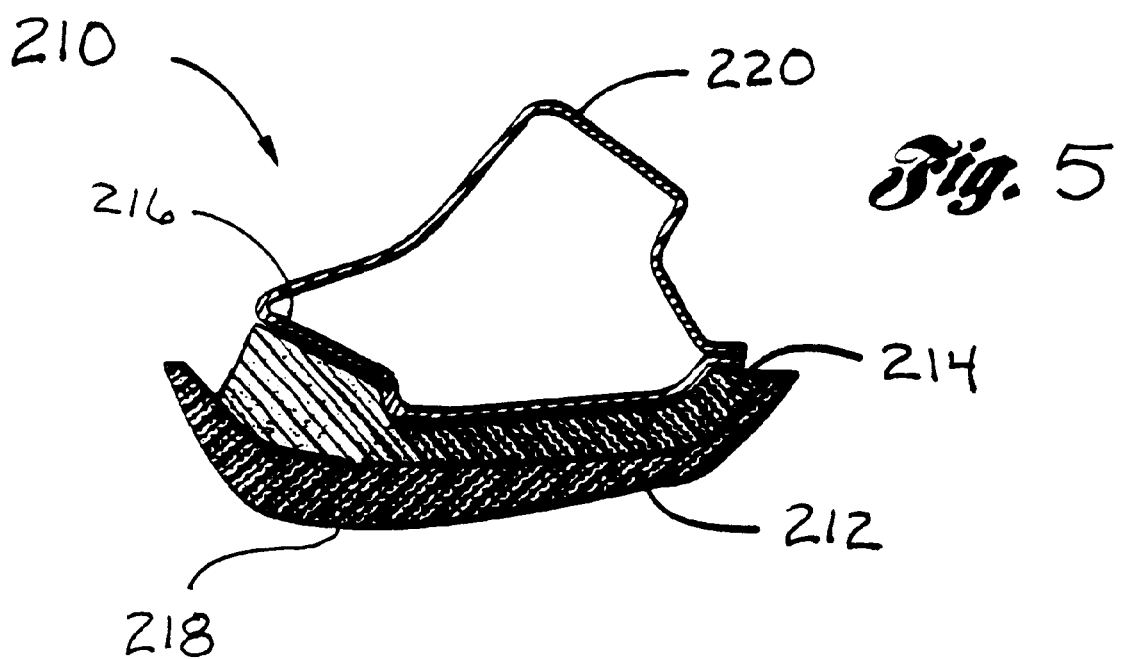
FIG. 5 is a cross-sectional view of a multiform substrate made by the method of FIG. 4.

As shown in FIG. 5, interior trim substrate 210 includes high density urethane foam portion 212 and structural foam portion 214 integral therewith to define inner surface 216 and outer surface 218. In this embodiment, high density urethane foam portion 212 may act as a soft aesthetic outer layer for a show surface of an A-pillar section of a vehicle compartment. Structural foam portion 214 acts as an energy absorbing layer for collision impacts.

Outer surface 218 acts as a decorative cover or self-skinning surface having aesthetic features, eliminating the need of cloth disposed thereon. This may be accomplished by having portions 12, 14 of mold 10 be in communication with one or a plurality of heating platens (not shown) in order to heat mold 10 during method 110 of the present invention. The heating platens may be heated to a temperature ranging between 120° F. and 200° F. in order to heat mold 10 to a temperature between 120° F. and 150° F. When the mold 10 is heated, the foam in contact with lower section 28 is molded to the shape of either first mold cavity 32 or second mold cavity 34. The molded foam takes on a grain texture and firm surface. As a result of heating mold 10, interior trim substrate 210 has outer surface 218 with aesthetic features that do not require cloth or an outer layer to be placed thereon. If desired, additional cloth or outer layer may be attached thereto in order to provide a more aesthetic look.

Alternatively, the decorative cover or outer layer may be placed in mold 10 prior to injecting foam in mold 10, eliminating the need of attaching an outer layer after heating. In this embodiment, the decorative cover may be applied by a cloth placed thereon, as mentioned above, or by a color spray sprayed onto mold 10 prior to injecting foam in mold 10. Other ways of applying a decorative cover in the mold prior to injecting foam in the mold do not fall beyond the scope and spirit of this invention. Also, although FIG. 5 depicts inner surface 216 flanking sheet metal structure 220, it is to be noted that surface 216 may be configured adjacent only one side of structure 220, as desired.

Figure 6:
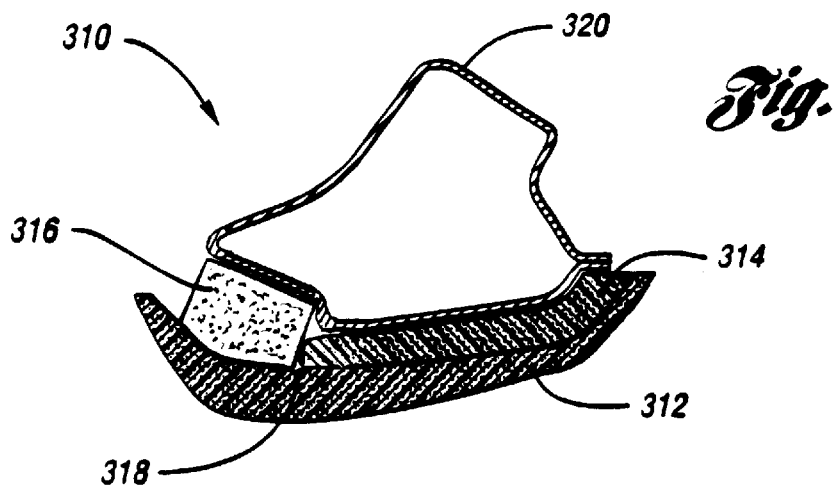
FIG. 6 is a cross-sectional view of another multiple foam substrate formed with an airbag made by the method of FIG. 4.

As shown in FIG. 6, substrate 310 includes high density urethane foam 312, structural foam 314 attached to foam 312, and deployable airbag 316 also attached to foam 312. This may be accomplished by loading deployable airbag 316 onto high density urethane foam 312 after storing first foam 43 in first mold cavity 32 and prior to injecting second foam 45 in second mold cavity 34. In this embodiment, second section 22 is be formed without extension 24 to allow space for airbag 316 on foam 312. It is to be noted that airbag 316 may be loaded onto foam 312 automatically, e.g., by robotics, or manually, e.g., by hand. As shown, high density urethane foam 312 also includes notch 318 formed between airbag 316 and structural foam 314 in order to accommodate deployment of airbag 316. As airbag 316 deploys upon impact, notch 318 provides a portion of high density urethane foam 312 adjacent airbag 316 to flex away from sheet metal structure 320, allowing airbag 316 to deploy in the vehicle compartment.

Figure 7:
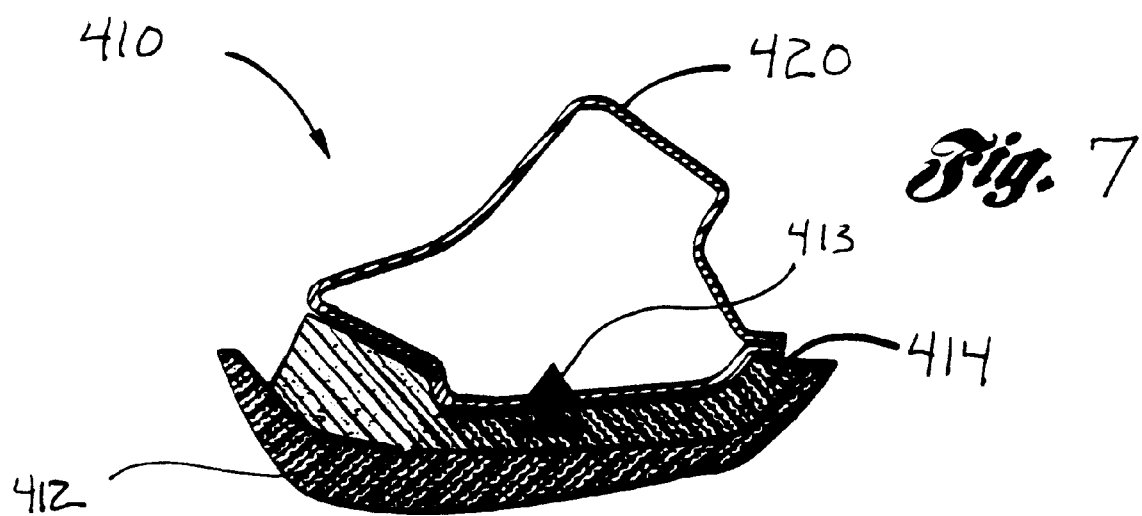
FIG. 7 is a cross-sectional view of yet another multiple foam substrate formed with a fastener by the method of FIG. 4.

As shown in FIG. 7, conventional fastener 413 or a plurality of fasteners 413 may be disposed within the mold in order to be bonded to foams 412, 414 to provide an interior trim substrate 410 having an integral fastener that may be directly attached to structure 420 of the vehicle. This eliminates the need of adhesives used to glue the fasteners onto the substrate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a multiple foam substrate of predetermined shape with a mold having first and second mold cavities, the method comprising:

injecting a first foam into the first mold cavity sufficiently to fill the first mold cavity;

storing the first foam in the first mold cavity for a predetermined time sufficient to form a substantially non-mixing surface on the first foam, wherein the non-mixing surface has a notch formed thereon;

loading a deployable airbag onto the non-mixing surface;

injecting a second foam into the second mold cavity and onto the non-mixing surface on the first foam sufficiently to fill the second mold cavity after the step of loading the airbag; and storing the second foam in the second mold cavity for a predetermined time sufficient to bond the first foam to the second foam along the non-mixing surface, thereby defining the multiple foam substrate having the predetermined shape, and wherein the notch formed on the non-mixing surface allows for airbag deployment.

2. The method of claim 1 wherein the first foam is injected in the mold at a first closed position.

3. The method of claim 2 wherein the second foam is injected in the mold at a second closed position.

4. The method of claim 1 wherein the first foam is a high density polyurethane foam having a density ranging between 80–125 kg/m$^3$.

5. The method of claim 1 wherein the second foam is a polyurethane structural foam having a density ranging between 40–150 kg/m$^3$.

6. The method of claim 1 wherein the step of injecting the first foam includes injecting the first foam at a temperature range of between 70 to 90 degrees Fahrenheit and a pressure range of between 90 to 3000 pounds per square inch gauge, and for a time period of 1 to 15 seconds.

7. The method of claim 1 wherein the predetermined time for storing the first foam ranges between 2.0 and 3.0 minutes.

8. The method of claim 1 wherein the step of injecting the second foam includes injecting the second foam at a temperature range of between 70 to 90 degrees Fahrenheit and a pressure range of between 90 to 3000 pounds per square inch gauge, and for a time period of 1–15 seconds.

9. The method of claim 1 wherein the predetermined time for storing the second foam ranges between 2.0 and 3.0 minutes.

10. The method of claim 1 further comprising:
removing the substrate from the mold; and
curing the substrate at about 70 degrees Fahrenheit for approximately 1 to 2 days.

11. The method of claim 1 further comprising heating the mold to a temperature between about 100 and 150 degrees Fahrenheit to define the substrate having a firm outer surface.

12. The method of claim 1 further comprising loading a substrate component in the mold prior to injecting the first foam in the first cavity.

13. The method of claim 12 wherein the component is a fastener.

14. A method of manufacturing a multiple foam substrate of a predetermined shape for selective impact energy absorption, structural differences, and airbag deployment with a mold having first and second cavities, the method comprising:

injecting a first foam into the first mold cavity sufficiently to fill the first mold cavity;

storing the first foam in the first mold cavity for a predetermined time sufficient to form a substantially non-mixing surface on the first foam;

loading a deployable airbag onto the non-mixing surface;

injecting a second foam into the second mold cavity and onto the non-mixing surface adjacent the deployable airbag sufficiently to fill the second mold cavity, wherein the non-mixing surface has a notch formed thereon to allow for airbag deployment; and storing the second foam in the second mold cavity for a predetermined time sufficient to bond the first foam to the second foam along the non-mixing surface, whereby to define the multiple foam substrate having the predetermined shape.

15. The method of claim 14 wherein the first foam is injected in the mold at a first closed position.

16. The method of claim 15 wherein the second foam is injected in the mold at a second closed position.

17. The method of claim 14 wherein the first foam is a high density urethane foam having a density ranging between 80–125 kg/m$^3$.

18. The method of claim 14 wherein the second foam is a polyurethane structural foam having a density ranging between 40–150 kg/m$^3$.

19. The method of claim 14 wherein the step of injecting the first foam includes injecting the first foam at a temperature range of between 70 to 100 degrees Fahrenheit and a pressure range of between 90 to 3000 pounds per square inch gauge, and for a time period of 1 to 15 seconds.

20. The method of claim 14 wherein the predetermined time for storing the first foam ranges between 2.0 and 3.0 minutes.

21. The method of claim 15 wherein the step of injecting the second foam includes injecting the second foam at a temperature range of between 70 to 90 degrees Fahrenheit and a pressure range of between 90 to 3000 pounds per square inch gauge, and for a time period of 1–15 seconds.

22. The method of claim 14 wherein the predetermined time for storing the second foam ranges between 2.0 and 3.0 minutes.

23. The method of claim 14 further comprising:
removing the substrate from the mold; and
curing the substrate at about 70 degrees Fahrenheit for approximately 1 to 2 days.

24. The method of claim 14 further comprising heating the mold to a temperature between about 120 and 150 degrees Fahrenheit to define the substrate having a firm outer surface.

25. The method of claim 14 further comprising loading a substrate component in the mold prior to injecting the first foam in the first cavity.

26. The method of claim 25 wherein the component is a fastener.

* * * * *